(12) United States Patent
Le Calvez et al.

(10) Patent No.: US 10,114,138 B2
(45) Date of Patent: Oct. 30, 2018

(54) METHOD TO DENOISE PULSE ECHO MEASUREMENT USING TOOL RESPONSE IN FRONT OF COLLARS

(71) Applicant: Schlumberger Technology Corporation, Sugar Land, TX (US)

(72) Inventors: Jean-Luc Le Calvez, Clamart (FR); Sylvain Thierry, Clamart (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 78 days.

(21) Appl. No.: 15/338,865

(22) Filed: Oct. 31, 2016

(65) Prior Publication Data
US 2017/0168184 A1    Jun. 15, 2017

(30) Foreign Application Priority Data
Dec. 15, 2015 (EP) .................................. 15290311

(51) Int. Cl.
*G01V 1/48* (2006.01)
*E21B 47/00* (2012.01)
*G01V 1/40* (2006.01)
*G01V 1/50* (2006.01)

(52) U.S. Cl.
CPC ............ *G01V 1/48* (2013.01); *E21B 47/0005* (2013.01); *G01V 1/40* (2013.01); *G01V 1/50* (2013.01); *G01V 2210/32* (2013.01)

(58) Field of Classification Search
CPC ........ G01V 1/48; G01V 2210/32; G01V 1/40; G01V 1/50; E21B 47/0005
USPC .................................................. 367/25
See application file for complete search history.

(56) References Cited

U.S. PATENT DOCUMENTS

| 4,551,823 | A | 11/1985 | Carmichael et al. |
| 5,146,432 | A | 9/1992 | Kimball et al. |
| 5,216,638 | A | 6/1993 | Wright |
| 5,274,604 | A | 12/1993 | D'Angelo et al. |
| 5,699,246 | A * | 12/1997 | Plasek .................... E21B 47/00 175/50 |
| 5,763,773 | A * | 6/1998 | Birchak .............. E21B 47/0005 181/104 |
| 9,606,254 | B2 * | 3/2017 | Cheng ....................... G01V 1/48 |
| 2006/0067162 | A1 | 3/2006 | Blankinship et al. |
| 2011/0253364 | A1 | 10/2011 | Mosse et al. |
| 2014/0204700 | A1 | 7/2014 | Valero et al. |
| 2015/0177405 | A1 | 6/2015 | Jannin et al. |

OTHER PUBLICATIONS

Extended European Search Report issued in the related EP Application 15290311.8, dated Jun. 22, 2016 (11 pages).

* cited by examiner

*Primary Examiner* — Daniel L Murphy
(74) *Attorney, Agent, or Firm* — Michael Dae

(57) ABSTRACT

A method includes performing pulse echo measurements using a pulse echo tool. The method also includes detecting a casing collar using the pulse echo measurements performed by the pulse echo tool. The method further includes estimating a tool response of the pulse echo tool response at the casing collar using one or more processors based on the pulse echo measurement at the casing collar. The method also includes and removing the pulse echo tool response estimation from at least some of the pulse echo measurements not at the casing collar.

17 Claims, 5 Drawing Sheets

METHOD TO DENOISE PULSE ECHO MEASUREMENT USING TOOL RESPONSE IN FRONT OF COLLARS

CROSS-REFERENCE TO RELATED APPLICATIONS

The present invention claims the benefits of European Patent Application No. 15290311.8, filed on Dec. 15, 2015, titled "Method to Denoise Pulse Echo Measurement using Tool Response in front of Collars," the entire content of which is hereby incorporated by reference into the current application.

BACKGROUND

The present disclosure relates generally to acoustic measurements. In particular, the present disclosure relates to accurately measuring coherent noise and removing the coherent noise from pulse echo measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as any limitation to the claimed subject matter.

A wellbore may be drilled into a geological formation to extract oil and/or gas from the geological formation. Logging tools may determine a variety of characteristics of the wellbore and/or the geological formation. Logging tools may determine characteristics of the surrounding rock formation. Logging tools may also determine whether cement injected around the wellbore properly achieves zonal isolation. That is, to prevent the certain zones of the geological formation from interacting with one another within the wellbore and to prevent fluids from undesired zones entering the wellbore, the wellbore may be constructed by inserting a cylindrical casing into the wellbore and injecting the cement injected into an annulus between the casing and a wall of the wellbore (i.e., the geological formation). When the cement properly sets, fluids from one zone of the geological formation may be prevented from passing through the wellbore to interact with one another. However, the cement may not set as planned and/or the quality of the cement may be less than expected. Additionally, the cement may unexpectedly fail to set above a certain depth due to natural fissures in the geological formation.

A variety of pulse echo tools may be used to verify that the cement is properly installed. These pulse echo tools may pulse and measure reflected acoustic (e.g., sonic or ultrasonic) waves through the wellbore to obtain acoustic cement evaluation data at various depths and azimuths in the wellbore. However, recent developments in drilling and constructing the wellbore may reduce the strength of an acoustic signal to be measured. For example, the wellbore is increasingly drilled using heavier drilling fluids and constructed using thicker casings, which may attenuate the acoustic signal more than lighter drilling fluids and thinner casings. In addition, well casings are increasingly being installed using lighter cements that have acoustic properties more similar to fluids than heavier cements. To account for these developments, the operating frequency of pulse echo tools may be reduced, but doing so may introduce noise due to pulse echo tool electronics and intrinsic noise of a transducer of the pulse echo tools. This may be the case when using the transducer for both excitation and measurement.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended to familiarize the reader with certain aspects and contexts of embodiments of the present disclosure without limitation to the claimed subject matter.

Embodiments of the disclosure relate generally to improving pulse echo measurement, particularly by reducing coherent noise in the pulse echo measurement. In a first embodiment, a system includes a pulse echo tool including a transducer, wherein the transducer is configured to emit an acoustic pulse toward a casing, wherein the casing includes a first acoustic surface having a first thickness and a second acoustic surface having a second thickness, wherein the transducer is configured to emit acoustic pulses and obtain pulse echo measurements of reflected waveforms resulting from acoustic interactions between the acoustic pulses emitted by the transducer and the first acoustic surface or the second acoustic surface, or both. The system also includes a data processing system coupled to the pulse echo tool, wherein the data processing system includes a processor, wherein the processor is configured to receive the pulse echo measurements; detect the second acoustic surface in using the pulse echo measurement, wherein the second acoustic surface has a second thickness that is different than the first thickness; estimate a pulse echo tool response at the second acoustic surface; and remove the pulse echo tool response estimation from the pulse echo measurements at the first acoustic surface.

In a second embodiment, a tangible, non-transitory, machine-readable-medium, includes machine readable instructions to cause a transducer of a pulse echo tool to emit a first acoustic pulse. The tangible, non-transitory, machine-readable-medium, also includes machine readable instructions to measure a first reflected waveform resulting from an acoustic interaction between the first acoustic pulse and a first acoustic surface having a first thickness disposed in a wellbore. The tangible, non-transitory, machine-readable-medium, further includes machine readable instructions to cause the transducer of the pulse echo tool to emit a second acoustic pulse. The tangible, non-transitory, machine-readable-medium, also includes machine readable instructions to measure a second reflected waveform resulting from an acoustic interaction between the second acoustic pulse and a second acoustic surface having a second thickness disposed in the wellbore, wherein the second thickness is different from the first thickness. The tangible, non-transitory, machine-readable-medium, further includes machine readable instructions to estimate a pulse echo tool response based on the measurement at the second acoustic surface. The tangible, non-transitory, machine-readable-medium, also includes machine readable instructions to remove the pulse echo tool response estimation from the measurement of the first reflected waveform.

In a third embodiment, a method includes performing pulse echo measurements using a pulse echo tool. The method also includes detecting a casing collar using the pulse echo measurements performed by the pulse echo tool. The method further includes estimating a tool response of the pulse echo tool response at the casing collar using one or more processors based on the pulse echo measurement at the casing collar. The method also includes and removing the pulse echo tool response estimation from at least some of the pulse echo measurements not at the casing collar.

BRIEF DESCRIPTION OF THE DRAWINGS

Various aspects of this disclosure may be better understood upon reading the following detailed description and upon reference to the drawings in which.

DETAILED DESCRIPTION

Figure 1:
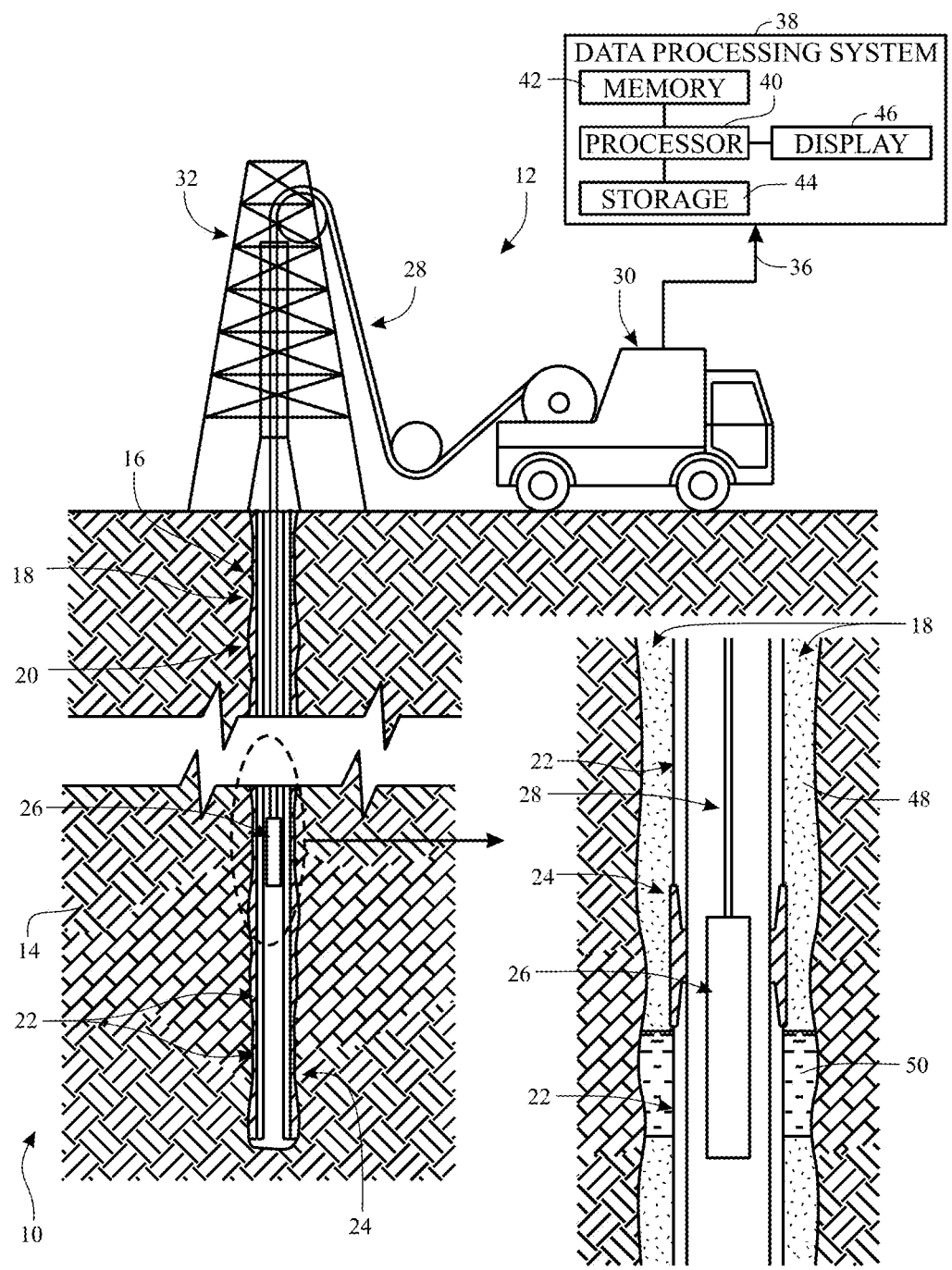
FIG. 1 is a is a schematic diagram illustrating a system for measuring and reducing coherent noise in logging data obtained by a downhole tool (e.g., a pulse echo tool) in accordance with an embodiment.

One or more specific embodiments of the present disclosure will be described below. These described embodiments are examples of the presently disclosed techniques. Additionally, in an effort to provide a concise description of these embodiments, certain features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time-consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool is moved through the well to obtain certain physical measurements. By processing these physical measurements, the characteristics of the well may be estimated. In the case of cement evaluation, for example, an acoustic logging tool (e.g., pulse echo tool) may emit pulses of acoustic (e.g., sonic or ultrasonic) energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain whether the material on the other side of the casing is a solid, and therefore likely to be properly installed cement. Other downhole tools may ascertain other well characteristics by, for example, emitting electromagnetic signals or radiation and detecting signals that return.

As mentioned above, recent developments in well drilling, such as heavier drilling fluids and lighter cement, may reduce the ability of the pulse echo tools to effectively determine cement quality. To account for these developments, the operating frequency of the pulse echo tools may be reduced, but doing so may introduce additional noise due to pulse echo tool electronics and intrinsic noise of a transducer of the pulse echo tools. This may especially be the case when using the transducer for excitation and measurement. Indeed, it is believed that the electronic circuitry of these tools may also produce a noise background that may be detected in the return signals. When an acoustic pulse is emitted and a return signal detected by the transducer and converted into an electrical signal for processing, the electronic circuitry of the tool may introduce noise into the electrical representation of the return signal. This noise may be coherent—that is, the noise may consistently tend to occur at the same points in time in relation to some starting point (e.g., from the initial generation of the acoustic pulse), even though the individual return signals may have different delays. This disclosure will focus on accurately measuring such coherent noise from downhole logging data for the purpose of reducing the coherent noise from the downhole logging data.

With this in mind, FIG. 1 is a schematic diagram illustrating a system 10 for measuring and reducing coherent noise in logging data obtained by a downhole tool 26 (e.g., a pulse echo tool) in accordance with an embodiment. In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 (e.g., casings) and casing collars (e.g., collars) 24—with cementing operations. The downhole tool 26 may be centered or eccentered in the wellbore 16.

Figure 2:
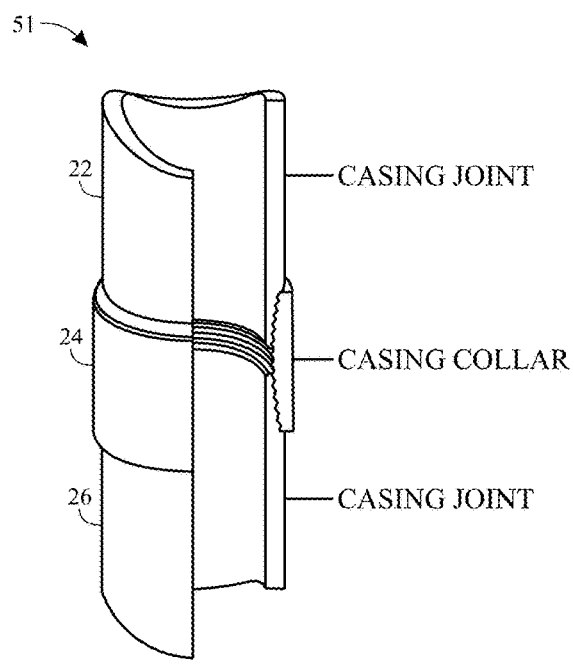
FIG. 2 is a schematic diagram of casings joined by a collar in accordance with an embodiment.

As seen in FIG. 2, a schematic diagram 51 of the casings 22 joined by the collar 24 in accordance with an embodiment. The casings 22 may be coupled together by the collar 24 to stabilize the wellbore 16. The casings 22 represent lengths of pipe, which may be formed from steel or similar materials. In one example, the casings 22 each may be approximately 13 m or 40 ft long, and may include an externally threaded (male thread form) connection at each end. A corresponding internally threaded (female thread form) connection in the collars 24 may connect two nearby casings 22. Coupled in this way, the casings 22 may be assembled to form a casing string to a suitable length and specification for the wellbore 16. The casings 22 and/or the collars 24 may be made of carbon steel, stainless steel, or other suitable materials to withstand a variety of forces, such as collapse, burst, and tensile failure, as well as chemically aggressive fluid.

The surface equipment 12 may carry out various well-logging operations to detect conditions of the wellbore 16. The well-logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more pulse echo tools 26 may obtain at least some of these measurements.

The example of FIG. 1 shows the pulse echo tool 26 being conveyed through the wellbore 16 by a cable 28. The cable 28 may be a mechanical cable, an electrical cable, or an electro-optical cable that includes a fiber line protected against the harsh environment of the wellbore 16. In other examples, the pulse echo tool 26 may be conveyed using any other suitable conveyance, such as coiled tubing. The pulse echo tool 26 may be, for example, an UltraSonic Imager tool and/or an Isolation Scanner tool provided by Schlumberger Technology Corporation. The pulse echo tool 26 may obtain measurements of acoustic impedance from ultrasonic waves and/or flexural attenuation. For instance, the pulse echo tool 26 may obtain a pulse echo measurement that exploits the thickness mode (e.g., in the manner of an ultrasonic imaging tool) or may perform a pitch-catch measurement that exploits the flexural mode (e.g., in the manner of the Isolation Scanner). These measurements may be used as acoustic cement evaluation data to identify likely locations where solid, liquid, or gas is located in the annulus 20 behind the casing 22.

The pulse echo tool 26 may be deployed inside the wellbore 16 by the surface equipment 12, which may include a vehicle 30 and a deploying system such as a drilling rig 32. Data related to the geological formation 14 or the wellbore 16 gathered by the pulse echo tool 26 may be transmitted to the surface, and/or stored in the pulse echo tool 26 for later processing and analysis. The vehicle 30 may be fitted with or may communicate with a computer and software to perform data collection and analysis.

FIG. 1 also schematically illustrates a magnified view of a portion of the cased wellbore 16. As mentioned above, the pulse echo tool 26 may obtain acoustic cement evaluation data relating to the presence of solids, liquids, or gases behind the casing 22. For instance, the pulse echo tool 26 may obtain measurements of acoustic impedance and/or flexural attenuation, which may be used to determine where the material behind the casing 22 is a solid (e.g., properly-set cement) or is not solid (e.g., is a liquid or a gas). When the pulse echo tool 26 provides the measurements to the surface equipment 12 (e.g., through the cable 28), the surface equipment 12 may pass the measurements as acoustic cement evaluation data 36 to a data processing system 38 that includes a processor 40, memory 42, storage 44, and/or a display 46. In other examples, the acoustic cement evaluation data 36 may be processed by a similar data processing system 38 at any other suitable location. The data processing system 38 may collect the acoustic cement evaluation data 36 and reduce coherent noise as taught in the present disclosure. After reducing the coherent noise, the data processing system 38 may determine whether such data 36 represents a solid, liquid, or gas using any suitable processing (e.g., T3 processing, Traitement Très Tôt, or Very Early Processing). One example of this processing technique is described in U.S. Pat. No. 5,216,638, "Method and Apparatus for the Acoustic Investigation of a Casing Cemented in a Borehole," which is assigned to Schlumberger Technology Corporation and is incorporated by reference herein in its entirety. To do this, the processor 40 may execute instructions stored in the memory 42 and/or storage 44. As such, the memory 42 and/or the storage 44 of the data processing system 38 may be any suitable article of manufacture that can store the instructions. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In this way, the acoustic cement evaluation data 36 from the pulse echo tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when the indicate the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36 to reduce the coherent noise, ascertaining the character of the annular fill 18 may be more accurate and/or precise than comparable processing when the coherent noise remains in the acoustic cement evaluation data 36.

Figure 3:
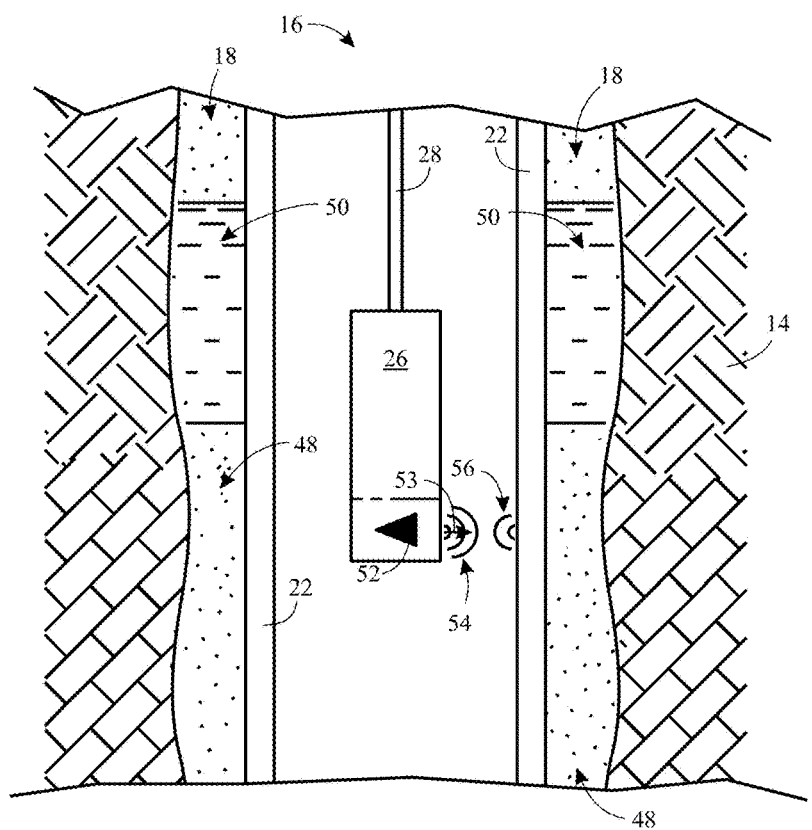
FIG. 3 is a schematic diagram of a pulse echo tool that may be used to obtain a pulse echo measurement in accordance with an embodiment.

With the foregoing in mind, FIG. 3 is a schematic diagram of the pulse echo tool 26 that may be used to obtain a pulse echo measurement in accordance with an embodiment. In particular, a transducer 52 in the pulse echo tool 26 may be oriented in a direction 53 approximately normal to the casing 22 such that the transducer 52 may emit acoustic waves 54 directed at the casing 22. The transducer 52 may detect reflected waves 56 that may be a result of acoustic interactions between the acoustic waves 54 and an acoustic surface of the casing 22. The transducer 52 may detect additional reflected waves that may be a result of acoustic interactions between the acoustic waves 54 and the annular fill (e.g., the cement) 18 and/or the geological formation 14.

Figure 4:
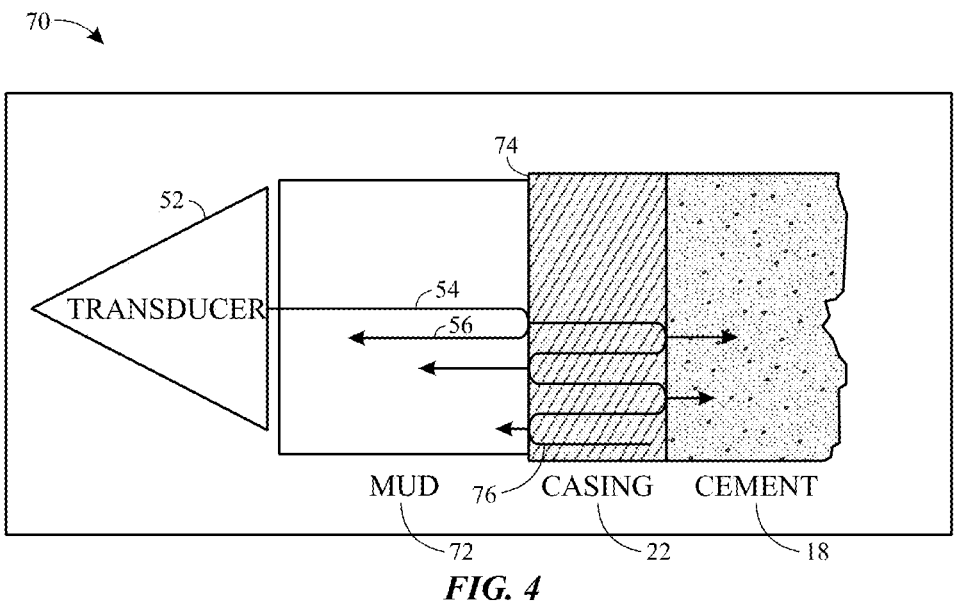
FIG. 4 is a schematic diagram of acoustic waves emitted from a transducer of a pulse echo tool and acoustic interactions of the acoustic waves in accordance with an embodiment.

Turning now to FIG. 4, which is a schematic diagram 70 of the acoustic waves 54 emitted from the transducer 52 of the pulse echo tool 26 and the acoustic interactions of the acoustic waves 54 in accordance with an embodiment. The transducer 52 may be a single emitter-receiver transducer that operates at approximately a few hundred kilohertz (e.g., 200-300 kHz). The transducer 52 (and the pulse echo tool 26) may be surrounded by a fluid 72 (e.g., mud) while in the wellbore 16. The transducer 52 may send a normal incident pulse 54 (e.g., an acoustic signal) that makes the casing 22 vibrate in a direction normal to the casing 22. A large portion of energy 56 resulting from the acoustic interaction between the normal incident pulse 54 and the casing 22 is reflected at a fluid-casing interface 74 and a small portion of the energy 76 is transmitted into the casing 22. Proportions of the reflected energy (R) and the transmitted energy T) are induced by acoustic impedances of the fluid $Z_1$ and the casing $Z_2$, according to the formula:

$$R = \frac{Z_2 - Z_1}{Z_2 + Z_1} \text{ and } T = 1 + R = \frac{2Z_2}{Z_2 + Z_1}. \tag{1}$$

The acoustic impedance (in MRayls) is defined by the product:

$$Z = \rho V_p \tag{2}$$

where $\rho$ is the bulk density (in g/cm³) and $V_p$ is the compressional velocity (in km/s). This phenomenon of reflection and transmission happens at both inner and outer surfaces of the casing 22 and results in a back-and-forth propagation 76 inside the casing 22. The resulting acoustic pressure recorded by the transducer 52 may be processed to measure the distance to, the thickness of, and the acoustic impedance behind, the casing 22.

The pulse echo measurement as illustrated in FIG. 4 may be subject to coherent noise of various origins. The noise may be a result of any imperfection exhibited during a full measurement acquisition chain (from inputting voltage at the transducer 52 to recording the reflected waveform 56 for measurement). The noise may include electronic (analog and/or digital) non-transducer noise. The noise may also include transducer noise. For example, the noise may be generated when firing the transducer 52 and include a backing echo (i.e., as a result of not fully dampening a back signal) and/or a non-ideal (with respect to theory) emitted pulse. As another example, the noise may be generated during reception of the reflected waveform 56 by the transducer 52 when a ceramic of the transducer 52 is hit by the reflected waveform 56 that has sensed the casing 22. A finite size of the ceramic and a sensor of the transducer 52 may generate "side-modes" that interact with the reflected waveform 56. The coherent noise (i.e., both the transducer noise and the non-transducer noise) may have non-negligible energy in a frequency band of interest.

It is noted that pulse echo measurements at the collars 24 result in no or very little amplitude resonance at a nominal frequency of interest in comparison to the pulse echo measurements at the casing 22:

$$f_0 = V_{cas}/2d \tag{3}$$

where $V_{cas}$ is compressional velocity in the casing 22 and d is a nominal thickness. The lack of amplitude resonance in the collar 24 is a result of a thickness of the collar 24 and the frequency of operation of the pulse echo tool 26. The lack of amplitude resonance may also be observed in other changes of thickness from the thickness of the casing 22. In particular, a sufficiently increased change of thickness from the thickness of the casing 22 may result in a similar lack of amplitude resonance.

Figure 5:
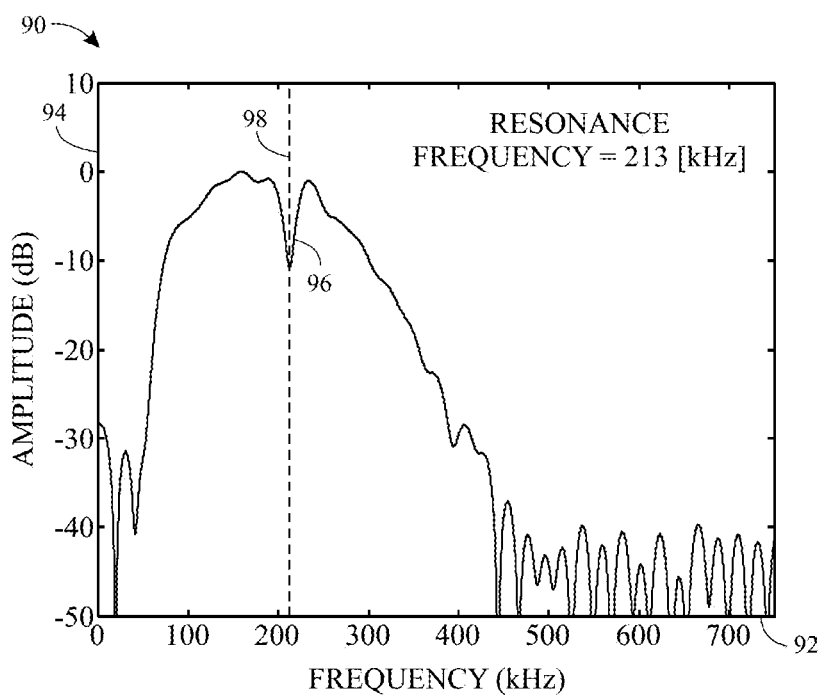
FIG. 5 is a plot of a spectrum of a pulse echo measurement acquired at the casing in accordance with an embodiment

With the foregoing in mind, FIG. 5 is a plot of a spectrum 90 of a pulse echo measurement acquired at the casing 22 with an ordinate 94 representing amplitude (in dB) in relation to an abscissa 92 representing frequency (in kHz) in accordance with an embodiment. The plot exhibits a notch 96 at a resonance frequency 98 of 213 kHz that corresponds to the coherent noise in the pulse echo measurement.

Figure 6:
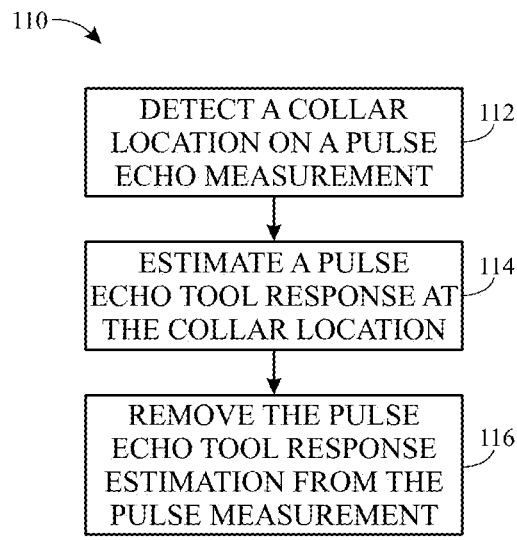
FIG. 6 is a flowchart of a method to reduce coherent noise in a pulse echo measurement in accordance with an embodiment.

Turning now to FIG. 6, which is a flowchart of a method 110 to reduce coherent noise in a pulse echo measurement in accordance with an embodiment. The method 110 may be performed by a data processing system, such as the data processing system 38. In some embodiments, the data processing system may be a tangible, non-transitory, machine-readable-medium that includes machine readable instructions that perform the method 110. The data processing system 38 may detect (block 112) a change of thickness from the thickness of the casing 22 (e.g., a collar location) on the pulse echo measurement. In particular, the collar 24 may be located by estimating the resonance frequency 98 or a thickness (e.g., where the collar 24 has a known thickness) from the pulse echo measurement. In some embodiments, the collar 24 may be detected by comparing the resonance frequency 98 or the thickness from the pulse echo measurement to a threshold difference from a nominal frequency level. In alternative or additional embodiments, the collar 24 may be detected by using jump detection through wavelet transform or statistical analysis based on the resonance frequency 98 or the thickness from the pulse echo measurement.

The data processing system 38 may estimate (block 114) a pulse echo tool response at the collar location. The estimation of the pulse echo tool response at the collar 24 may be built using statistical criteria (e.g., based on the pulse echo measurement). Because the pulse echo tool response at the collar 24 may lack amplitude resonance, the pulse echo tool response at the collar 24 may be largely and/or substantially composed of coherent noise (e.g., 50% or more of the pulse echo tool response at the collar 24 is composed of coherent noise). The data processing system 38 may remove (block 116) the pulse echo tool response estimation at the collar 24 from the pulse echo measurement to reduce the coherent noise in the pulse echo measurement. The data processing system 38 may also use the pulse echo tool response estimation at the collar 24 to reduce coherent noise from other pulse echo measurements (e.g., performed in the same wellbore 16).

Figure 7:
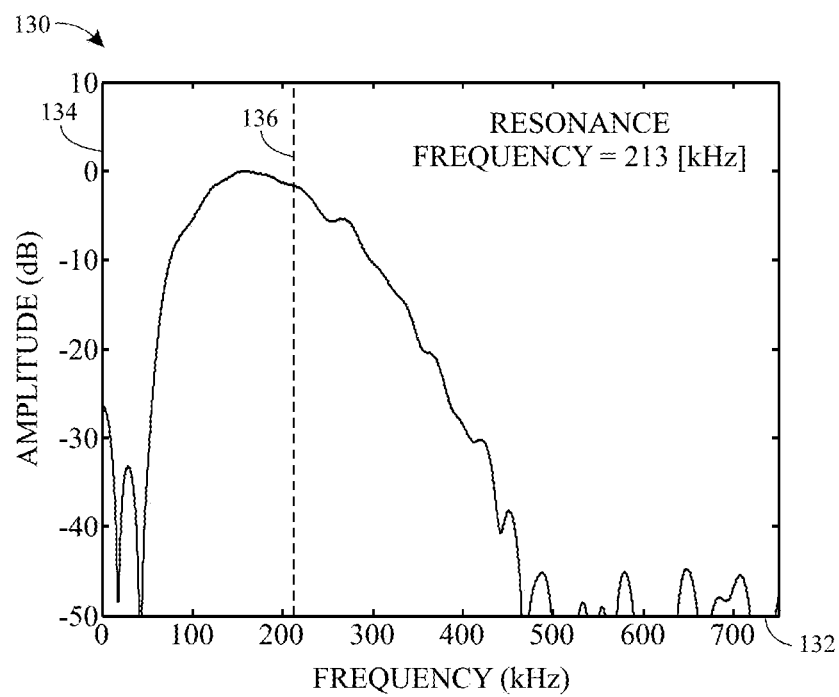
FIG. 7 is a plot of a spectrum of a pulse echo measurement with a pulse echo tool response estimation at a collar removed from the pulse echo measurement in accordance with an embodiment.

With the foregoing in mind, FIG. 7 is a plot of a spectrum 130 of the pulse echo measurement illustrated in FIG. 5 with the pulse echo tool response estimation at the collar 24 removed from the pulse echo measurement in accordance with an embodiment. The plot includes an ordinate 134 representing amplitude (in dBs) in relation to an abscissa 132 representing frequency (in kHz). With the pulse echo tool response estimation at the collar 24 removed, the plot no longer exhibits a notch 96 at a resonance frequency 136 of 213 kHz that corresponds to the coherent noise in the pulse echo measurement. Instead, the spectrum 130 is smooth at the resonance frequency 136 because the coherent noise has been reduced.

Advantageously, the disclosed systems and methods are not dependent on the downhole tool 26 being centered or eccentered in the wellbore 16. Instead, the disclosed systems and methods use estimation of changes of thickness to the thickness of the casing 22 (e.g., the collars 24) that are clearly detectable on pulse echo measurements. In some embodiments, false detection (e.g., where the change in thickness or the collar 24 generates a resonance at the frequency of interest) may be avoided by identifying changes of thickness from the thickness of the casing 22 or collars 24 that include a sufficiently low threshold amplitude resonance. That is, in some embodiments, if the change of thickness has an amplitude resonance that is higher than the threshold amplitude resonance (inclusive or exclusive), it may be disregarded as a false detection. Otherwise, if the change of thickness has an amplitude resonance that is lower than the threshold amplitude resonance (inclusive or exclusive), it may be used as a valid change of thickness or collar 24. Additionally, estimating the pulse echo tool response at the collar location is robust against environmental (e.g., pressure, temperature, etc.) conditions. This is especially useful because accurate measurement of coherent noise may be dependent on environmental conditions.

Figure 8:
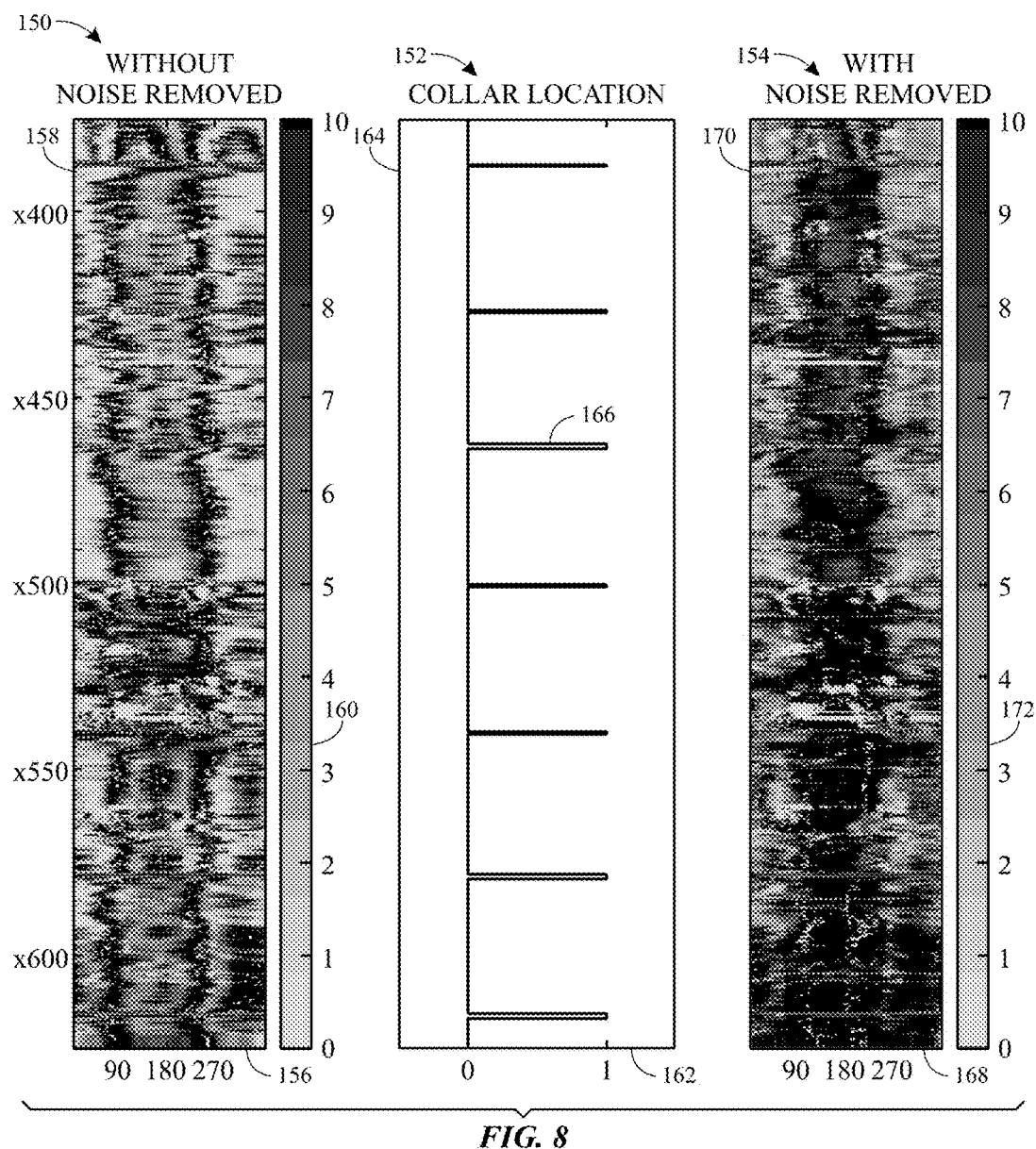
FIG. 8 illustrates three plots of pulse echo measurements in accordance with an embodiment.

Turning now to FIG. 8, which illustrates three plots 150, 152, 154 of pulse echo measurements in accordance with an embodiment. The first plot 150 displays an acoustic impedance (in MRayls) inverted from a pulse echo measurement, where the pulse echo tool response estimation at the collar 24 has not been removed from the first plot 150. The first plot 150 includes an ordinate 158 representing a depth of the pulse echo tool 26 in the wellbore 16 in relation to an abscissa 156 representing an azimuth of the transducer 52 of the pulse echo tool 26 (in degrees). The first plot 150 thus illustrates the acoustic impedance of the annular fill 18 behind the casing 22, which may have a solid character (e.g., due to properly-set cement) or a generally liquid or gas character (e.g., due to the cement being either absent, the wrong type or consistency, and/or fluid or gas channels formed in the cement). The chart 160 indicates the character of the annular fill 18, where the increasing values (i.e., 0 to 10) and darkness (i.e., light to dark) represent increasing solidity (i.e., less solid to more solid) of the annular fill 18. The first plot 150 illustrates transitions between high impedance cement (at 90°) to low impedance cement (from 90° to 270°) to high impedance cement (at 270°) to low impedance cement (from 270° to 90°). The number and severity of these transitions is physically improbable, and is a result of coherent noise in the pulse echo measurement. In particular, the coherent noise may be observed as two high impedance lines at approximately the 90° and 270° azimuths.

The second plot 152 displays detected collars 24, where an ordinate 164 represents the depth of the pulse echo tool 26 in the wellbore 16 in relation to an abscissa 162 which represents detection of the collar 24. The pulse echo tool response may be estimated at any of the illustrated collar locations, such as the collar location 166.

The third plot 154 displays an acoustic impedance (in MRayls) inverted from the pulse echo measurement, where the pulse echo tool response estimation at the collar 24 has been removed from the third plot 154. The third plot 154 includes an ordinate 170 representing the depth of the pulse echo tool 26 in the wellbore 16 in relation to an abscissa 168 representing the azimuth of the transducer 52 of the pulse echo tool 26 (in degrees). The chart 172 indicates the character of the annular fill 18. Because the pulse echo tool response estimation at the collar 24 has been removed from the third plot 154, the coherent noise in the third plot 154 is reduced compared to the first plot 150. In particular, the third plot 154 reveals a less questionable and more realistic character of the annular fill 18, with low impedance cement (from 270° to 90°) and high impedance cement (from 90° to 270°) on opposite sides of the casing 22.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
   performing pulse echo measurements using a pulse echo tool, wherein the pulse echo tool comprises a transducer;
   detecting a casing collar using the pulse echo measurements performed by the pulse echo tool;
   estimating a tool response of the pulse echo tool response at the casing collar using one or more processors based on the pulse echo measurement at the casing collar; and
   removing the pulse echo tool response estimation from at least some of the pulse echo measurements not at the casing collar.

2. The method of claim 1, wherein the pulse echo tool is centered in a wellbore.

3. The method of claim 1, wherein the pulse echo tool is eccentered in a wellbore.

4. The method of claim 1, wherein the transducer is configured to emit a sonic pulse.

5. The method of claim 1, wherein the transducer is configured to emit an ultrasonic pulse.

6. The method of claim 1, wherein the pulse echo measurement is obtained by the transducer.

7. The method of claim 1, wherein the transducer comprises a single emitter-receiver that operates at approximately a few hundred kilohertz.

8. The method of claim 1, wherein the pulse echo tool response at the casing collar substantially comprises only coherent noise.

9. The method of claim 1, wherein the pulse echo measurement comprises a measurement of an acoustic interaction between an acoustic pulse and a casing comprising a first thickness.

10. The method of claim 9, wherein the casing collar comprises a second thickness greater than the first thickness.

11. The method of claim 10, wherein the second thickness results in no or very little amplitude resonance when measured by the pulse echo tool.

12. The method of claim 10, wherein the second thickness corresponds to an amplitude resonance that is lower than a threshold amplitude resonance.

13. The method of claim 1, wherein the pulse echo tool response is estimated based on statistical criteria.

14. A tangible, non-transitory, machine-readable-medium, comprising machine readable instructions to:
   cause a transducer of a pulse echo tool to perform pulse echo measurements;
   detect a casing collar using the pulse echo measurements performed by the pulse echo tool;
   estimate a tool response of the pulse echo tool response at the casing collar based on the pulse echo measurement at the casing collar; and remove the pulse echo tool response estimation from at least some of the pulse echo measurements not at the casing collar.

15. The tangible, non-transitory, machine-readable-medium from claim 14, wherein the pulse echo measurement comprises a measurement of an acoustic interaction between an acoustic pulse and a casing comprising a first thickness.

16. The machine-readable-medium of claim 15, wherein the casing collar comprises a second thickness greater than the first thickness, wherein the second thickness corresponds to no or very little amplitude resonance when measured by the pulse echo tool.

17. The machine-readable-medium of claim 15, wherein the casing collar comprises a second thickness greater than the first thickness, wherein the second thickness corresponds to an amplitude resonance that is lower than a threshold amplitude resonance.

\* \* \* \* \*